United States Patent [19]

Otto et al.

[11] Patent Number: 5,743,978
[45] Date of Patent: *Apr. 28, 1998

[54] HINGED SUPPORT OR THE LIKE FOR THE ARTICULATED CONNECTION OF CHASSIS PARTS IN MOTOR VEHICLES

[75] Inventors: Silke Otto, Marl; Alfons Nordloh, Visbek, both of Germany

[73] Assignee: Lemförder Metallwaren AG, Stemwede-Dielingen, Germany

[*] Notice: The term of this patent shall not extend beyond the expiration date of Pat. No. 5,720,833.

[21] Appl. No.: 557,972

[22] Filed: Nov. 13, 1995

[30] Foreign Application Priority Data

Nov. 19, 1994 [DE] Germany .................. 44 41 220.7

[51] Int. Cl.⁶ .................................................. B32B 31/16
[52] U.S. Cl. ............... 156/73.1; 156/73.5; 156/242; 156/309.6; 264/445; 264/68
[58] Field of Search ............................. 156/73.1, 73.5, 156/242, 292, 293, 304.1, 304.6, 308.2, 309.6; 264/442, 443, 445, 68

[56] References Cited

U.S. PATENT DOCUMENTS 3,985,601  10/1976  Panagrossi .................. 156/229
4,782,580  11/1988  Cacioppo et al. ............ 29/597
5,174,840  12/1992  Anderson .................... 156/69
5,205,895  4/1993  Hohman, Jr. et al. ......... 156/293
5,342,464  8/1994  McIntire et al. ............. 156/172

FOREIGN PATENT DOCUMENTS 19 73 796  11/1963  Germany .

OTHER PUBLICATIONS

Von Peter Rektorik, Sep. 1994, Neue Verbundbremsschei be Für den BMW M5 Automobiltechnisch e Zeitschrift 96 (1994).

Primary Examiner—James Sells
Attorney, Agent, or Firm—McGlew and Tuttle

[57] ABSTRACT

A hinged support or the like for the articulated connection of chassis parts in motor vehicles, in which bearing eyes (1, 2) provided at the ends are connected to one another in one piece by a shaft part (5). The shaft part (5), manufactured according to the injection molding process, has an inner, longitudinally extending hollow section and a smooth outer contour.

18 Claims, 4 Drawing Sheets

HINGED SUPPORT OR THE LIKE FOR THE ARTICULATED CONNECTION OF CHASSIS PARTS IN MOTOR VEHICLES

FIELD OF THE INVENTION

The present invention pertains to a hinged support or the like for the articulated connection of chassis parts in motor vehicles in which bearing eyes provided at the ends of the hinge support are connected to one another in one piece by a shaft part.

BACKGROUND OF THE INVENTION

Such hinged supports are manufactured in practice as parts not requiring any tools according to the injection molding process from a suitable material. The weight and also the cost are reduced as a result, and the geometry is simple. However, it is not possible to design a smooth outer contour, especially of the shaft part, for molding technical reasons, so that hinged supports of this design are subject to intense accumulation of dirt during practical use, as a result of which the reduction in weight achieved is lost. Complicated three-dimensional injection moldings must be manufactured in the case of complicated geometric shapes. This leads to high costs and long lead times for mold-making.

SUMMARY AND OBJECTS OF THE INVENTION

The primary object of the present invention is to design a hinged support possessing the features of the preamble, while maintaining known advantages, with a smooth outer contour and high rigidity.

According to the invention, a hinged support or the like for the articulated connection of chassis parts in motor vehicles is provided in which bearing eyes are provided at the ends of the hinged support and are connected to one another in one piece by a shaft part. The invention provides that the shaft part has a smooth outer contour and has an inner longitudinally extending hollow space.

The shaft part is preferably manufactured using an injection molding process and is formed with a tubular cross-section and a smooth outer contour. End pieces are provided which are manufactured separately. The shaft part connects the end pieces to one another and the shaft piece and end pieces are assembled and connected to one another only after separate manufacture. The end pieces, manufactured separately, are also preferably manufactured using the injection molding process. The end pieces may also include hollow shaft section portions manufactured at the same time, namely formed in one piece with an associated end section. These hollow shaft sections are connected to one another at their ends (front side) to form the hinged support.

The shaft part may also be formed with a plurality of longitudinally extending hollow spaces. The end pieces and the ends of the shaft part may be provided to engage each other at a point of connection.

The invention further provides a process for manufacturing a hinge support wherein end pieces are manufactured separately using an injection molding process and are connected to the shaft part by a technique including bonding ultrasonic welding or orbital welding. As a further aspect of the invention, the end pieces may be made separately using the injection molding process and the shaft part may be made separately and all three pieces may be joined using one of the techniques noted above.

Both of the preferred embodiments make possible the arrangement of hollow spaces, which are closed in themselves (closed to the outside), within the shaft part of the hinged support with a smooth outer contour, so that the risk of the accumulation of dirt is considerably reduced. Higher stability of the component, i.e., a higher section modulus and higher moment of inertia, can also be achieved due to the hollow spaces arranged on the inside. Finally, better utilization of material also leads to the saving of material and thus to a cost reduction. The space available for installation can be better utilized.

Cross-sectional sections which are favorable for stability, e.g., box sections, oval sections or sections with a plurality of longitudinally extending hollow spaces separated by ribs are preferred for the shaft part.

The end pieces with the bearing eyes and the shaft part are either manufactured separately and are subsequently assembled using prior-art joining techniques, or the end pieces, manufactured separately according to the injection molding process, already have a hollow shaft projection, so that the two hollow shaft projections can be connected to one another on their front side. Prior-art joining techniques, e.g., the bonding technique, the ultrasonic welding technique, the orbital welding technique, etc., are suitable for this purpose as well.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
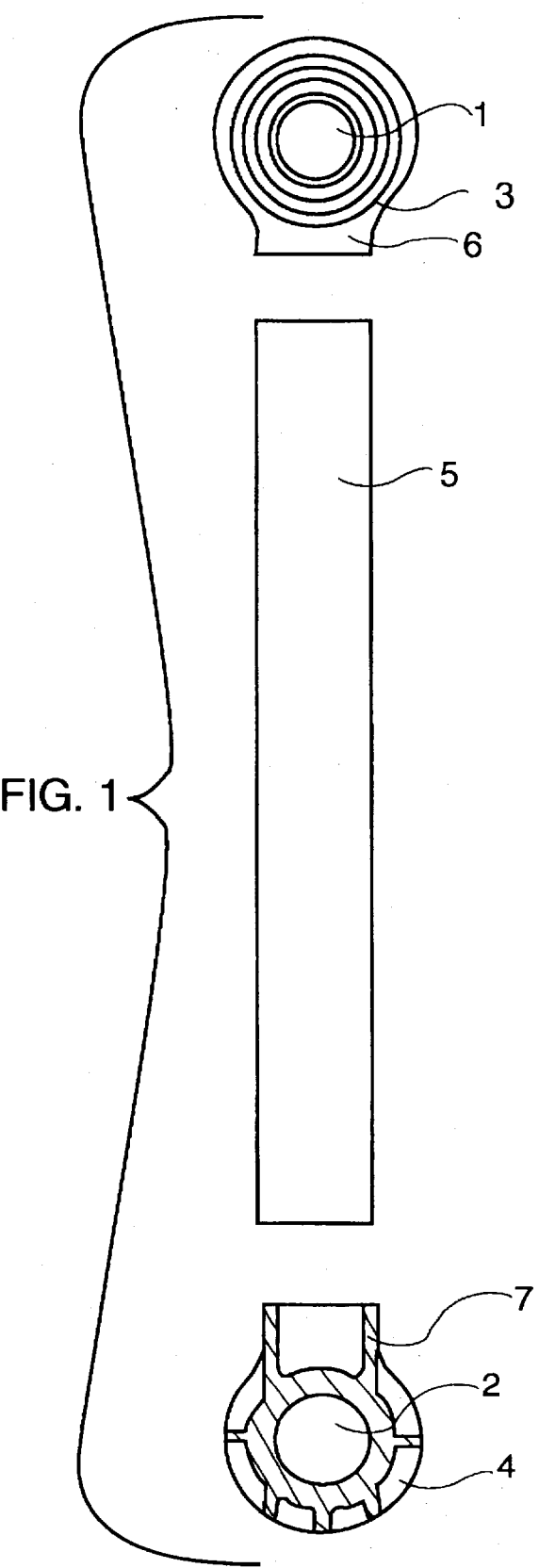
FIG. 1 is an exploded view, partly in section of an exemplary embodiment according to the invention.

Referring to the drawings and to FIG. 1 in particular, the invention comprises a hinged support with end pieces 3 and 4. The first end piece 3 has a bearing eye 1 and the second end piece 4 has a bearing eye 2. A shaft part is provided which defines at least one hollow region. The end pieces 3 and 4 and shaft part 5 are preferably made of plastic.

The end pieces 3 and 4 and the shaft part 5 are manufactured according to the injection molding process. Connection portions 6 and 7 are provided for connection to the end faces of the shaft part 5. The connection portions 6 and 7 are provided on the end pieces 3 and 4. The connection portions 6 and 7 are connected to the end faces of the shaft part 5, e.g., by a bonding technique or preferably by ultrasonic welding or orbital welding. It may be advantageous for this connection for the ends of the shaft part 5 and the connections 6 and 7, respectively, to mutually engage each other, so that the parts are connected, e.g., bonded or welded, to one another in an area in which they are inserted into each other.

Figure 2:
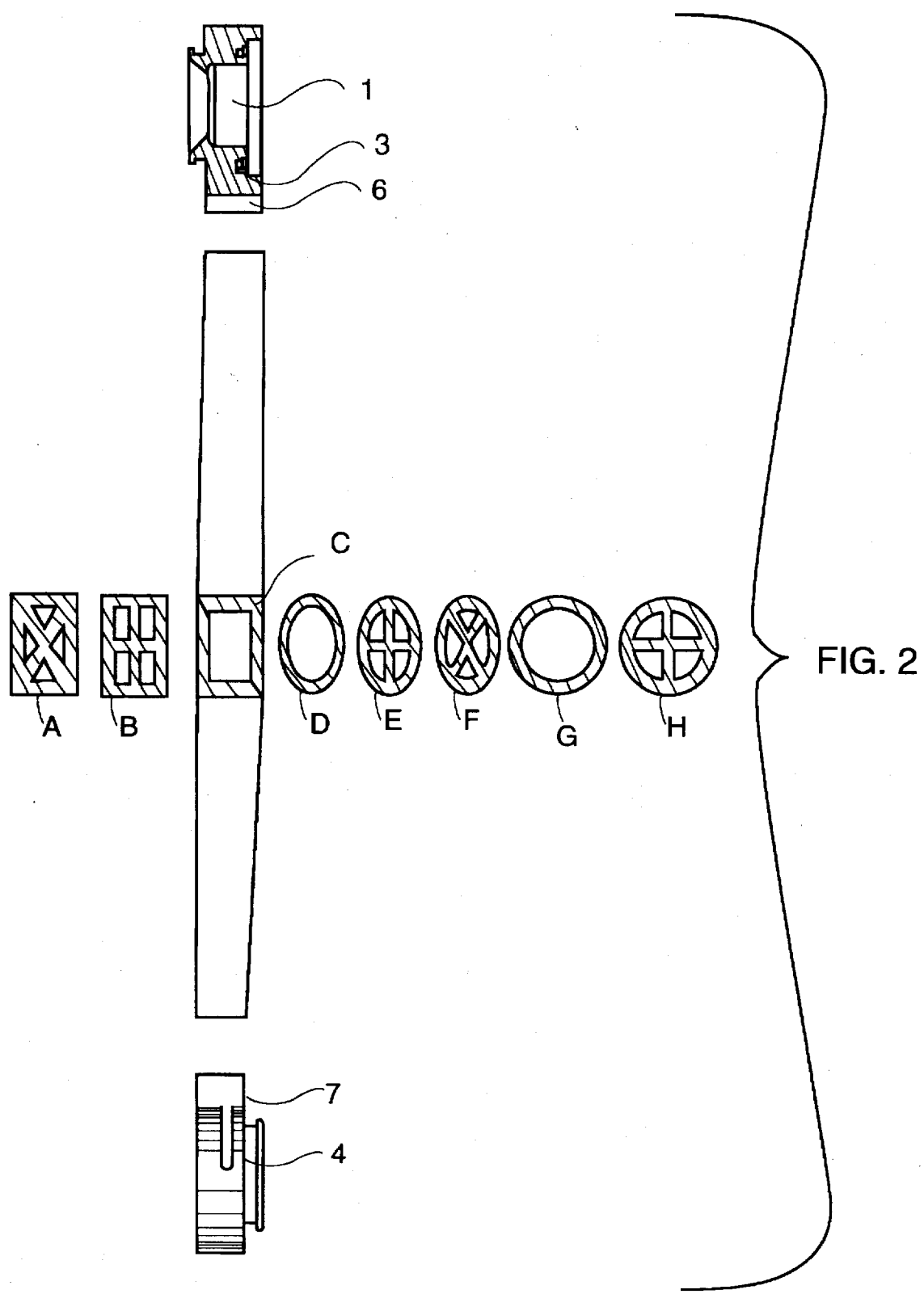
FIG. 2 is a view rotated by 90° compared with FIG. 1 with A, B, C, D, E, F, G and H providing a representation of possible cross-sectional shapes.

The shaft part 5 may be designed as a part defining a hollow section, which can be manufactured according to the injection molding process. Possible cross-sectional shapes of the shaft part 5 are shown in FIG. 2. The cross-sectional views A, B and C show box sections, wherein the sections A and B have a plurality of longitudinally extending hollow spaces, which are separated from one another by inner webs. Round or oval sections according to the cross-sectional views D, E, F, G, and H may correspondingly be designed as well, in which case the cross-sectional sections E, F, and H also have hollow spaces separated from one another by inner webs (also referred to herein as ribs). Sections of the type shown are characterized by a high utilization of material at the highest possible rigidity. Consequently, they have a high moment of inertia and a high section modulus.

Figure 3:
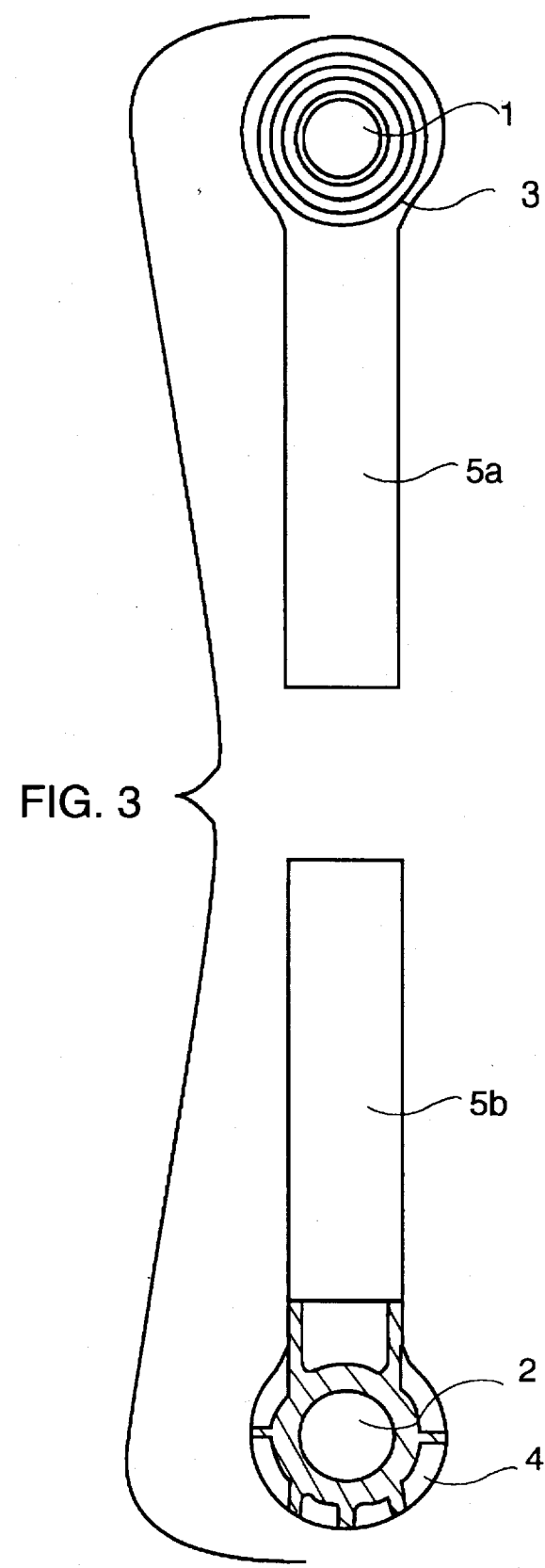
FIG. 3 is an exploded view, partly in section of an exemplary embodiment different from the embodiment in FIGS. 1 and 2.
Figure 4:
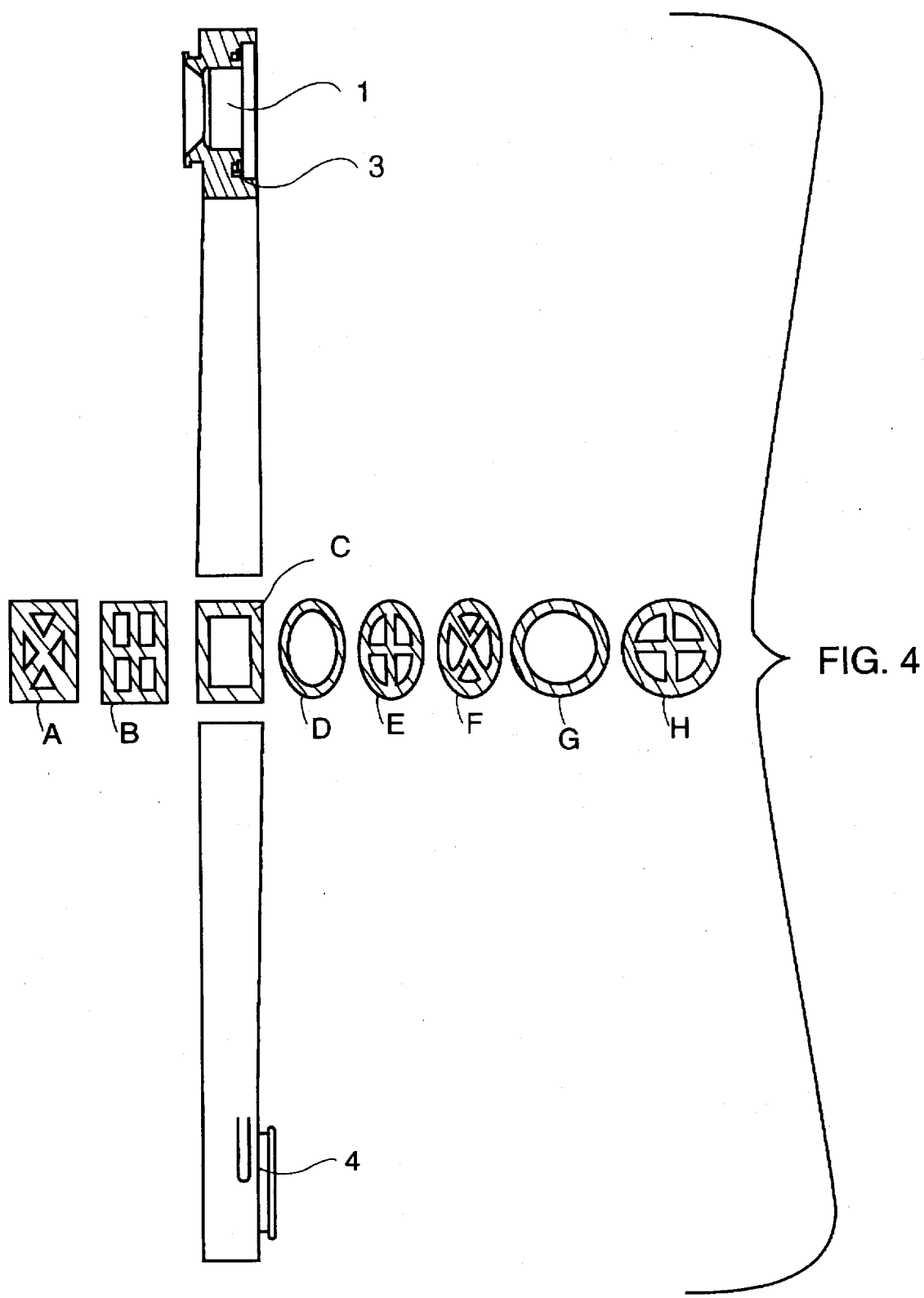
FIG. 4 is a view rotated by 90° compared with FIG. 3 with A, B, C, D, E, F, G and H a representation of possible cross-sectional shapes.

An exemplary embodiment which is different from this is shown in FIGS. 3 and 4. In this exemplary embodiment, end pieces 3 and 4 are made, each with hollow shaft sections Sa and Sb, in one piece according to the injection molding process, and the hollow shaft sections are subsequently connected to one another on their front sides. The hollow shaft sections 5a and 5b have a smooth outer contour and at least one inner, longitudinally extending hollow space in this embodiment as well. The cross-sectional shapes A, B, C, D, E, F, G, and H shown correspond to the description of the exemplary embodiment shown in FIGS. 1 and 2. In the exemplary embodiment according to FIGS. 3 and 4, the hinged support comprises only two, separately manufactured parts, so that a connection is to be performed. This connection is also performed according to a prior-art joining technique, as mentioned above. The point of connection for the two hollow shaft sections 5a and 5b is preferably located in the middle of the hinged support, as a result of which embodiments in which the dimension of the cross section of the hinged support is reduced from the middle toward the end pieces become possible. However, the hollow shaft sections 5a and 5b may also be designed as sections of different length.

While specific embodiments of the invention have been shown and described in detail to illustrate the application of the principles of the invention, it will be understood that the invention may be embodied otherwise without departing from such principles.

What is claimed is:

1. A process for manufacturing a hinged support including a first end portion defining a first bearing eye, a second end portion defining a second bearing eye and a shaft part connecting said end portions, the process comprising the steps of:

manufacturing an injection molded first end piece and an injection molded second end piece separately from each other;

manufacturing an injection molded shaft part to provide an injection molded shaft part defining a longitudinally extending hollow space; and joining said first end piece and said shaft part and joining said second end piece and said shaft part by one of bonding, ultrasonic welding and orbital welding.

2. A process for manufacturing a hinged support, comprising the steps of:

manufacturing a first injection molded end piece, the first end piece defining a first bearing eye and including a first hollow shaft section;

manufacturing an injection molded second end piece, the second end piece defining a second bearing eye and including a second hollow shaft section;

joining said first hollow shaft section and said second hollow shaft section by one of bonding, ultrasonic welding and orbital welding.

3. A process according to claim 1, wherein said shaft part has a tubular cross-section and a smooth outer contour and is connected to said first end piece and said second end piece, after manufacture.

4. A process according to claim 1, wherein each end piece has a hollow shaft section, a first hollow shaft section of said first end piece and a second hollow shaft section of said second end piece being connected to one another at hollow shaft section end faces of said shaft part to form said shaft part.

5. A process according to claim 1, wherein said shaft part is formed to define a plurality of longitudinally extending hollow spaces.

6. A process according to claim 5, wherein said plurality of longitudinally extending hollow spaces is formed including webs.

7. A process according to claim 1, wherein said end pieces and end faces of said shaft part engage each other at connection points.

8. A process for manufacturing a hinged support, comprising the steps of:

manufacturing a first end piece and a second end piece separately from each other, said first and second end pieces each defining a bearing eye;

manufacturing a molded shaft part to provide a shaft part defining a longitudinally extending hollow space; and joining said first end piece, said shaft part, and said second end piece together to form the hinged support with the first and second end pieces on opposite ends of said shaft part.

9. A process in accordance with claim 8, wherein:
said joining closes said hollow space.

10. A process in accordance with claim 8, wherein:
said shaft part is formed separately from said first and second end pieces.

11. A process in accordance with claim 10, wherein:
said shaft part completely closes said hollow space except for longitudinal ends of said shaft part.

12. A process in accordance with claim 8, wherein:
said shaft part includes a first shaft part and a second shaft part, said first shaft part being formed with said first end piece, said second shaft part being formed with said second end piece;
said joining including joining said first shaft part to said second shaft part.

13. A process according to claim 8, wherein:
said shaft part has a tubular cross-section and a smooth outer contour and is connected to said first end piece and said second end piece, after manufacture of said shaft part.

14. A process according to claim 8, wherein:
each end piece has a hollow shaft section, a first hollow shaft section of said first end piece and a second hollow shaft section of said second end piece being connected to one another at hollow shaft section end faces of said shaft part to form said shaft part.

15. A process according to claim 8, wherein:
said shaft part is formed to define a plurality of longitudinally extending hollow spaces.

16. A process according to claim 15, wherein:
said plurality of longitudinally extending hollow spaces is formed including webs.

17. A process according to claim 8, wherein:
said end pieces and end faces of said shaft part engage each other at connection points.

18. A process in accordance with claim 8, wherein:
a joint between said first and second end pieces is in a plane substantially parallel to an axis of said bearing eye of each of said end pieces.

* * * * *